G. W. OTTERSON.
DUMP WAGON.
APPLICATION FILED DEC. 21, 1914.
1,163,949.
Patented Dec. 14, 1915.
2 SHEETS—SHEET 1.
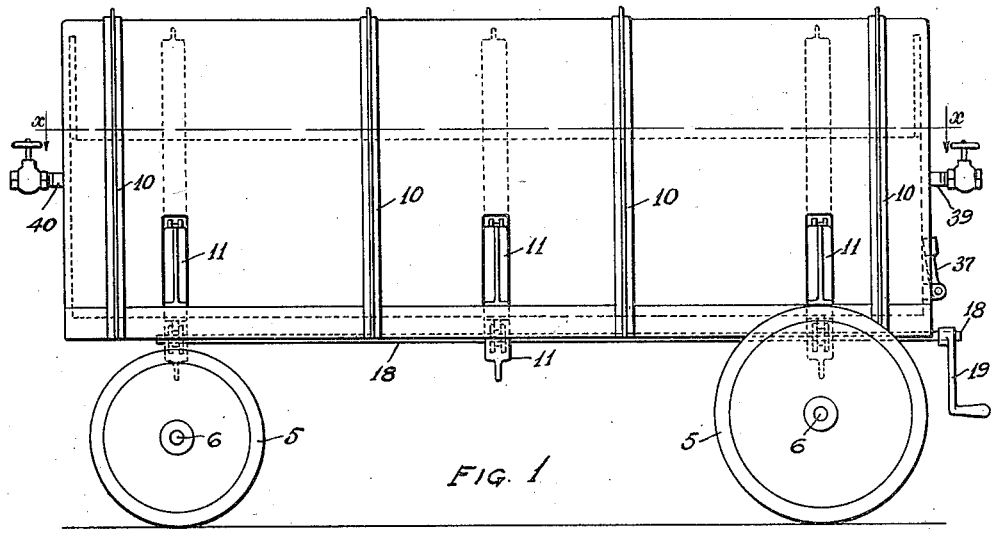
FIG. 1
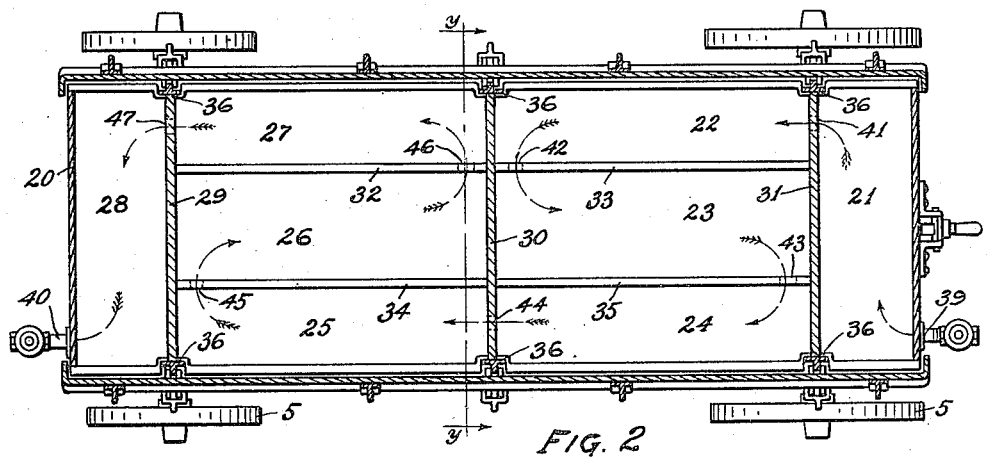
FIG. 2
FIG. 5
WITNESSES:
INVENTOR
George W. Otterson
BY
C. D. Haskins
ATTORNEY

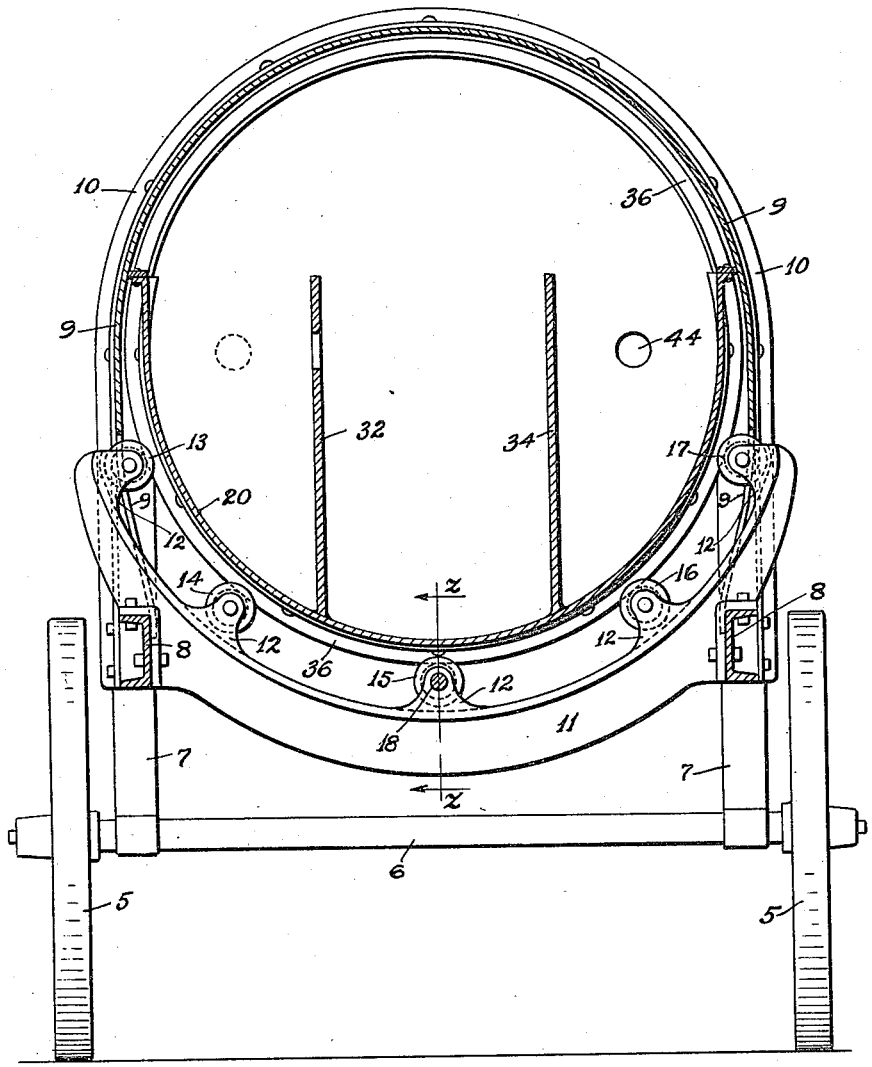
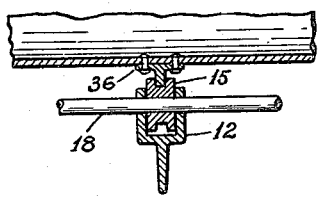

UNITED STATES PATENT OFFICE.

GEORGE W. OTTERSON, OF SEATTLE, WASHINGTON.

DUMP-WAGON.

1,163,949.  Specification of Letters Patent.  Patented Dec. 14, 1915.

Application filed December 21, 1914. Serial No. 878,203.

*To all whom it may concern:*

Be it known that I, GEORGE W. OTTERSON, citizen of the United States, residing at Seattle, in the county of King and State of Washington, have invented a certain new and useful Improvement in Dump-Wagons, of which the following is a specification.

My invention relates to improvements in dump wagons, and the primary object thereof is to provide a dump wagon having a receptacle embodying a plurality of compartments so arranged and associated, that liquid pumped into one of such compartments shall upon filling such compartment, overflow into another adjacent compartment and upon filling such adjacent compartment shall then overflow therefrom into the next adjacent compartment and so on to fill all compartments one after another whereupon such liquid may overflow from the last filled compartment to escape from said receptacle. During the passage of water through the several compartments of said receptacle the clear water may be separated from any sediment therein and issue therefrom as clear water leaving such sediment in the several compartments where it will have settled. The flow of water is continued till the several compartments are filled with such sediment whereupon the dump wagon may be drawn to a desired point where such sediment may be dumped, and a further object is to provide such dump wagon with means whereby its load may be easily and quickly dumped.

I attain these objects by devices illustrated in the accompanying drawings wherein—

Figure 1 illustrates a dump wagon embodying my invention by a view in side elevation; Fig. 2 is a view in horizontal section of the same on broken line *x*, *x* of Fig. 1; Fig. 3 is an enlarged view of my dump wagon in vertical cross-section on broken line *y*, *y* of Fig. 2; Fig. 4 is a view in vertical section of parts of my invention on broken line *z*, *z* of Fig. 3, and Fig. 5 is a view in elevation of other parts of my invention.

Referring to the drawings throughout which like reference numerals indicate like parts, upon the running gear of a wagon, indicated by wheels 5 and axles 6, is mounted a wagon frame indicated by supports 7 and side rails 8 of channel iron.

A hood-like cover 9, of heavy sheet-iron, whose upper portion is of semi-cylindrical form and which is reinforced by four straps 10 of iron having a T shaped cross-section, has its opposite lower edges, together with the opposite lower ends of said straps 10, secured respectively to the side rails 8 to be supported thereby.

Secured, to and extending between, the side rails 8 are three curved cradle-bars 11, each of whose outer and upper ends project outwardly through openings provided in each of opposite sides of the lower portion of the hood-like cover 9, and the upper concaved edge of each of the cradle-bars 11 is provided with five bearing brackets 12 within each of which is rotatably mounted a grooved roller, as grooved rollers 13, 14, 15, 16 and 17, of which rollers the rollers corresponding to the rollers 13, 14, 16 and 17 on all three of the cradle-bars 11 are independently rotatable on their pivots, while the three rollers corresponding to the lowermost roller 15, on all three of said cradle-bars, are all securely mounted on a shaft 18 to be rotatable thereby, said shaft 18 being disposed to extend lengthwise of the wagon and through its respective bearing brackets 12 to adapt it to rotate in response to the turning of a crank 19 which is attachable to its rearwardly projecting end.

Within the hood cover 9 is disposed a receptacle 20 whose cross-section is substantially of the form of a semicircle and whose end walls are of the form of a complete circle.

As shown in Fig. 2 the receptacle 20 is divided into eight compartments 21, 22, 23, 24, 25, 26, 27 and 28, by means of partitions 29, 30, 31, 32, 33, 34 and 35. The three partitions 29, 30 and 31 are made of heavy sheet iron of the form of a complete circle and are disposed transversely, and the partitions 32 and 34 are disposed to extend longitudinally between the transverse partitions 29 and 30, while the partitions 33 and 35 are disposed to extend longitudinally between the transverse partitions 30 and 31, all of which longitudinally disposed partitions are of such height as will cause their upper edges to register with the top of the sides of the receptacle 20, as more clearly indicated in Fig. 3.

Around the exterior of the receptacle on lines registering each with one of the planes of the partitions 29, 30 and 31 are secured hoops 36 forming a complete circle thus to bind the circular transverse partitions firmly in their positions, said hoops 36 each being of T shaped cross-section to provide an outwardly projecting rib which is adapted to be disposed within the grooves of the several rollers 13, 14, 15, 16 and 17 of the curved cradle-bars 11, whereby the three cradle-bars 11 in conjunction with such rollers may support the receptacle 20 in a manner to adapt it to be rotated to invert it for the purpose of dumping its contents, and to prevent it from endwise movements with relation to crade-bars 11.

Each of the rollers corresponding to the roller 15 which is mounted on the shaft 18, may be adapted by its diameter or by its vertical position to support a larger proportion of the weight of the loaded receptacle 20 than will any of the other rollers whereby when the shaft 18 is rotated by turning the crank 19 then the friction between the engaging surfaces of the rollers 15 and the hoops 36 will be sufficient to cause the receptacle 20 to be rotated thus to invert it to permit its contents to drop to the ground beneath the wagon.

In order to prevent rotary movements of the receptacle 20 at all times except when it is desired to dump its contents, the projecting end portion of the shaft 18 is squared and the crank 19 is provided with a square hole that fits the squared end portion of the shaft 18 so that the crank 19 may readily be attached and detached, and, as shown in Fig. 5, I have provided a bifurcated locking arm 37 that is pivotally attached to a bracket 38 which is secured to the rear end wall of the receptacle 20 in such position that when the receptacle 20 is in its normal upright position the locking arm 37 may be swung downwardly to engage its bifurcated members with the squared end portion of the shaft 18, to prevent the rotation of the shaft 18, the crank 19 being detached from such squared end portion of the shaft 18.

When it is desired to invert the receptacle 20 the bifurcated locking arm 37 is swung upwardly to lean over against the rear end wall of the receptacle 20, as shown more clearly in Fig. 1, and then the crank 19 is attached to the squared end portion of the shaft 18 whereupon such shaft 18 may be rotated to invert the receptacle 20.

As shown more clearly in Fig. 1, the rear end wall of the compartment 21 is provided with a valve-controlled inlet pipe 39 to which may be attached the delivery end of a hose (not shown) through which may be conducted to the receptacle the muddy water to be clarified, and the front end wall of the receptacle 20 is provided with a valve-controlled outlet pipe 40 through which the clarified water may escape from the top portion of the receptacle 20.

As shown in Fig. 2 near the top edge of the partition 31 there is provided a hole 41 through which the liquid may flow from the compartment 21 into compartment 22, while similar openings 42, 43, 44, 45, 46 and 47 are formed respectively in the partition walls 33, 35, 30, 34, 32 and 29. Therefore, if muddy water be permitted continuously to flow through the pipe 39 into the compartment 31, it would first fill such compartment and then overflow through the hole 41 to fill compartment 22 and continue in a like direction until the last compartment 28 is reached, at which point the same may be drawn off through the outlet pipe 40 in a substantially clarified condition. When the compartments are filled with sediment, the delivery hose may be disconnected from the inlet pipe 39 whereupon the wagon may be drawn to a place for dumping its contents in the manner hereinbefore described.

The top of the side edges of the receptacle 20 may be disposed sufficiently close to the inner surface of the circular portion of the hood-like cover 9 to prevent the slopping over and escape of the contents of the receptacle 20 due to movements of the wagon, or such side edges may be provided with a flexible packing, in the form of a flap, which may yieldingly engage such inner surface to prevent the escape of such contents through the narrow space between said side edges and said inner surface of the hood-like cover 9.

Manifestly, the receptacle 20 may be divided into a greater or less number of compartments than I have shown in Fig. 2 as may be required under different conditions and changes may be made in the forms, dimensions and arrangement of the parts of my invention without departing from the spirit thereof.

What I claim is:

1. A dump wagon comprising a running gear, supporting means and a receptacle mounted thereon associated with said running gear, a driving shaft for said supporting means, said shaft having a squared end, and a forked arm carried by said receptacle adapted to be moved to engaging position with the squared end of the shaft to arrest movement of said receptacle.

2. A dump wagon comprising a running gear, supporting means and a receptacle mounted thereon associated with said running gear, a driving shaft for said supporting means, and coöperating means on the receptacle and driving shaft engageable together to lock both the receptacle and shaft from rotary movement.

3. A dump wagon comprising a running gear, supporting means, a receptacle revolubly mounted on the said supporting means, a driving shaft for said supporting means, and coöperating means on the driving shaft and receptacle engageable together when the receptacle is in vertical position and arranged to lock the receptacle and shaft from rotary movement.

4. A dump wagon comprising a running gear, supporting means carried by the running gear, a receptacle revolubly mounted on the supporting means, a driving shaft arranged to rotate the supporting means and thereby cause rotation of the receptacle, and a locking member pivotally mounted on the receptacle, the shaft having a portion engageable by the locking member when the receptacle is in upright position, said locking member and shaft having coöperating surfaces arranged to prevent rotation of the shaft when the locking member is engaged therewith.

In witness whereof, I hereunto subscribe my name this seventh day of December A. D., 1914.

GEORGE W. OTTERSON.

Witnesses:
A. HASKINS,
FRANK WARREN.

Copies of this patent may be obtained for five cents each, by addressing the "Commissioner of Patents, Washington, D. C."